Aug. 12, 1969   R. BURGER ET AL   3,460,275

PROGRAMMED INSTRUCTION RESPONSE CIRCUIT

Filed Sept. 26, 1966

INVENTORS
RUDOLF BURGER
HORST SCHOLZ

United States Patent Office 3,460,275
Patented Aug. 12, 1969

3,460,275
PROGRAMMED INSTRUCTION RESPONSE CIRCUIT
Rudolf Burger, Roblingen (See), and Horst Scholz, Eisleben, Germany, assignors, by mesne assignments, to VEB Mansfeld-Kombinat W. Pieck Eisleben, Eisleben, Germany
Filed Sept. 26, 1966, Ser. No. 581,794
Int. Cl. C09b 7/06, 1/00
U.S. Cl. 35—48         5 Claims

ABSTRACT OF THE DISCLOSURE

In a programmed response checking device, contacts of a question selecting switch close a "correct response" indicating circuit through a predetermined contact of a response selecting rotary switch and an armature of a relay. The relay is actuated both by said question selecting switch and by a release switch. The rotary arm of the rotary switch is mechanically coupled with a movable resistor which is heated upon actuation of said relay to make a position mark on a heat sensitive carrier irrespective of the condition of the "correct indicator."

---

Figure 1:
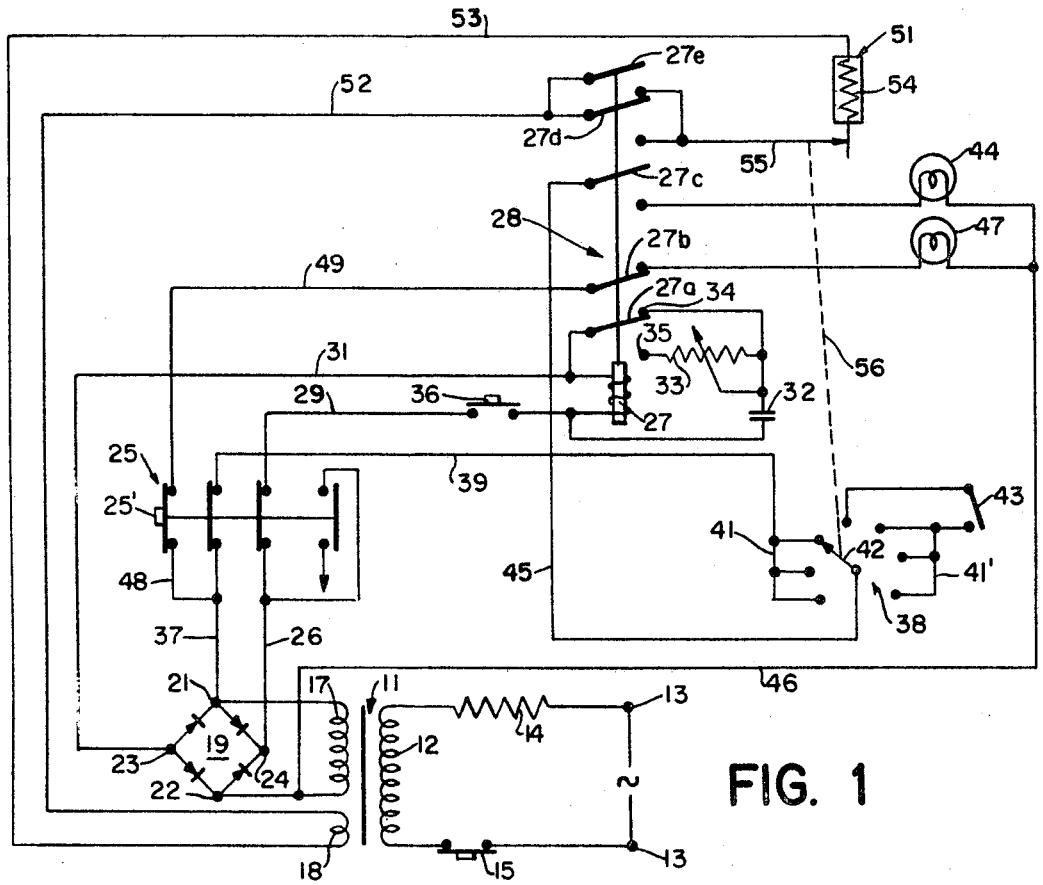

The present invention relates to a response circuit. More particularly, the invention relates to a response circuit in a programmed instruction system.

Various control or response circuits are utilized for teaching purposes in programmed instruction systems or courses. In one programmed instruction system, a known Moore arrangement distributes optical information. In the system utilizing the Moore arrangement, the program is recorded on film and the steps of the instruction program are projected by a lens system onto a projection screen. Programming is by the selection method. The addressee, respondant or student operates a set of keys to select a desired subject of instruction. When a key is operated, a corresponding picture is projected on a screen. The picture indicates the subject matter. Subsequently, a series of questions and answers are projected on the screen. The student then operates a key of the arrangement to select the answer which he considers correct. The arrangement then indicates whether the answer selected is correct or incorrect. The student may then operate a repeat key, which provides him with another opportunity to select an answer to the question.

In another programmed instruction system, a control panel is provided with a series of programs and series of questions and answers relating to the programs. The programs are recorded on film which is housed in special film magazines. As the program subject matter is projected on a projection screen, a series of questions or a project or objective are projected on the screen and the student utilizes the set of keys of a response circuit to select an answer. When the correct answer is selected, a "correct" signal lamp is energized and the next program subject matter is projected onto the screen. When an "incorrect" answer is selected, an "incorrect" signal lamp is energized and the result is indicated. Additional information is then projected onto the screen simultaneously with the "incorrect" signal. The project, objective or test is then evaluated by a stepping selector which counts the number of incorrect answers.

The known control or response arrangements or circuits are extremely complex and complicated and are therefore costly and expensive to manufacture. Furthermore, the students may only select answers which are "correct" or "incorrect," so that these circuits or arrangements are not adequate for eductional purposes. The students are distracted and disturbed, and their learning is thus impaired, by switch and motor noise occurring during movement of the film and by the projection of the wrong programs caused by wear of the coding equipment.

The principal object of the present invention is to provide a new and improved programmed instruction response circuit. The response circuit of the present invention avoids the shortcomings of the known response arrangements and is of simple structure, inexpensive to manufacture, and efficient, effective and reliable in operation. The response circuit of the present invention does not impair, but rather enhances the learning of the students, and provides an indication of the students' score in a short time. The response circuit of the present invention requires little maintenance and little or no repair or replacement of parts. The response circuit of the present invention utilizes known components, in accordance with the principle of prefabricated machine part assembly, to provide a control or response circuit in a progammed instruction system which indicates the errors of the students with accuracy and provides an exact qualitative error analysis.

In accordance with the present invention, a response circuit for a programmed instruction system comprises a rotary selector switch having a rotary switch arm and a plurality of contacts in operative proximity with the switch arm. The switch arm is rotatable for electrically contacting a selected one of the contacts. An indicating resistor indicates and records on a heat sensitive record carrier a position mark representing the selected answer, The indicating resistor is mechanically coupled to the switch arm of the rotary selector switch for varying the indication provided by the indicating resistor in accordance with the position of the rotary selector switch. A time-controlled relay has an excitation winding, a plurality of armatures controlled by the excitation winding and a time control circuit connected to the excitation winding for controlling the duration of energization of the excitation winding. A resistor energizing circuit is connected to the indicating resistor and provides a current flow through the indicating resistor. An armature of the relay is connected in the resistor energizing circuit for controlling the operation of the indicating resistor. A relay energizing circuit is connected to the excitation winding of the relay for energizing the excitation winding. A miniature key switch is connected in the relay energizing circuit and comprises a plurality of keys for selectively providing an identifying indication. A signaller is provided and a signaller energizing circuit is connected thereto for energizing it. An armature of the relay is connected in the signaller energizing circuit. The key switch and the rotary selector switch are connected in the signaller analyzing circuit.

Figure 2:
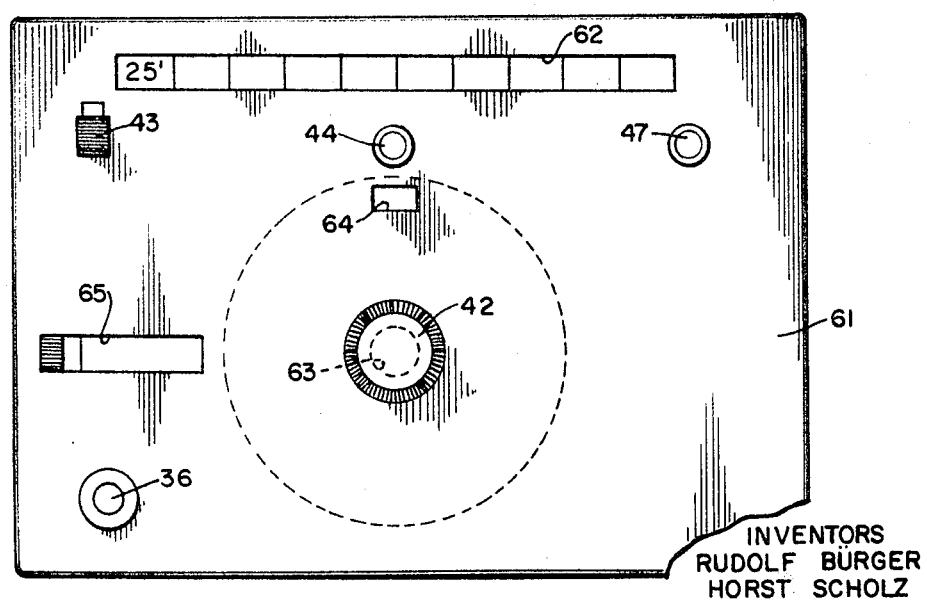

In order that the present invention may be readily carried into effect, it will now be described with reference to the accompanying drawings, wherein:

FIG. 1 is a circuit diagram of an embodiment of the programmed instruction response circuit of the present invention; and FIG. 2 is a front view of an embodiment of the housing of the embodiment of FIG. 1.

In FIG. 1, there is shown for the reason of simplicity a basic circuit arrangement for checking a selected response to one question only. To check individual responses to a number of questions according to the extent of the instruction program, it is necessary to provide the device with a corresponding number of key switches 25 and also with as many switching contacts 43 and switching segments 38 as there are questions in the teaching program. Each of the segments 38 correlated to respective switching contacts 43 has as many switching positions as there are responses to be considered for solution of a presented problem. In the embodiment as shown in FIG.

1 the selector switch segment 38 has seven positions, however the number thereof may vary according to the employed code for responses. The switching contact 43 is intended for adjusting the length of the code employed.

The student first prepares in writing his responses to respective questions and subsequently checks these responses by the aid of the present device as described hereinafter.

Referring now in more detail to the circuit diagram of FIG. 1, a transformer 11 comprises a primary winding 12 which is connected to an A.C. power source 13 via a supply switch 15.

The transformer 11 further comprises an output or secondary winding 17 and another output or tertiary winding 18. A full wave rectifier 19 has a pair of input terminals 21 and 22 connected to the ends of the secondary winding 17 and a pair of output terminals 23 and 24. The output terminal 24 of the rectifier 19 is connected to the third switching contact of a miniature key switch 25 via a lead 26 and said third switching contact is connected to one end of the energization or excitation winding 27 of a relay 28 via a lead 29. The other end of the energization or excitation winding 27 is connected to the output terminal 23 of the rectifier 19 via a lead 31.

The relay 28 comprises a plurality of relay-operated contact arms or armatures 27a, 27b, 27c, 27d and 27e which are controlled in position by the energization winding 27. The relay 28 is a time-controlled relay and its duration of energization of excitation is controlled by an RC circuit connected between the ends of the energization winding 27 through the armature 27a of said relay. The RC circuit comprises a capacitor 32 and a variable resistor 33 connected in series circuit arrangement with the energization winding 27. The relay armature 27a connects either the RC circuit in series with the energization winding 27 via a contact 34 or the capacitor 32 alone in series with said energization winding via a contact 35. The duration of the excitation of the relay 28 is determined by the adjustment of the resistor 33 to vary the amount of resistance in the RC circuit.

A release switch 36 is connected in the lead 29 between the key switch 25 and the energization winding 27 of the relay 28. One end of the secondary winding 17 is connected to the second switching contact of the key switch 25 via a lead 37. The latter contact of the key switch 25 is connected to the contacts of a rotary selector switch 38 via a lead 39. The rotary selector switch 38 comprises a plurality of contacts interconnected via leads 41 and 41' and a rotary switch arm 42 which is movable to contact any one of said contacts, as desired. A switch 43 is coupled to the rotary selector switch 38 to optionally connect or disconnect intermediate pair of contacts of the latter to adjust the length of the code for a particular program.

The rotary switch arm 42 of the rotary selector switch 38 is connected to a "correct" indicating lamp 44 via a lead 45 and the armature 27c of the relay 28. The lamp 44 is connected to the other end of the secondary winding 17 of the input transformer 11 via a lead 46. A "ready condition" lamp 47 is connected to the one end of the secondary winding 17 via the lead 37, a lead 48, the key switch 25, a lead 49, and the armature 27b of the relay 28. The "ready condition" lamp 47 is connected to the other end of the secondary winding 17 via the lead 46.

An indicating resistor 54 is connected between the ends of the tertiary winding 18 via a lead 52, the armatures 27d and 27e of the relay 28 and a lead 53. The indicating resistor 54 is mounted adjacent a scale or segmented indicator 51 which is made of heat sensitive material. The indicating resistor 54 is variable because an end 55 of the lead 52 is flexible and movable along said resistor to vary the amount of resistance connected in the circuit and, consequently, to change the location of the heated portion of the resistor above respective segments of the segmented indicator. In the position shown in FIG. 1, the maximum resistance of the indicating resistor 54 is connected in the circuit. The lead end 55 may be moved along the indicator resistor 54 from segment or scale area to segment.

The lead end 55 is mechanically coupled to the switch arm 42 of the rotary selector switch 38 by a mechanical linkage 56, so that said lead end is varied in position in accordance with the position of each switch arm. Thus, for example, if the switch arm 42 is in electrical contact with the lowermost of the contacts, the lead end 55 may be in electrical contact with the lowermost of the indicating resistor 54 segments; if said switch arm is moved to electrical contact with the next higher of the contacts, said lead end is moved to electrical contact with the next higher of the indicating resistor segments; if said switch arm is moved to electrical contact with the next higher of the contacts, said lead end is moved to electrical contact with the next to the highest of the indicating resistor segments; and if said switch arm is moved to electrical contact with the highest of the contacts, said lead end is moved to electrical contact with the highest of the indicating resistor segments.

The indicating resistor 54 functions by providing an indication, on heat-sensitive paper, for example, when current flows through it. When current, supplied by the tertiary winding 18, flows through one segment of the indicating resistor 54, the heat produced by said resistor provides a first indication which thus records a first selection made by a student, addressee or respondant. When current flows through two segments of the indicating resistor 54, the heat produced by said resistor provides a second indication which thus records a second selection made by a student. A third indication is provided and is recorded as a third selection, when current flows through three segments of the indicating resistor 54, and a fourth indication is provided and is recorded as a fourth selection, when current flows through four segments of said indicating resistor.

When a student wishes to check his response to a question, he closes the supply switch 15, thereby energizing the response checking circuit of the present invention. The "ready condition" lamp 47 is thereby turned "on." The student then operates the key switch 25, which comprises a plurality of key or keyboard switches which are independently operated although they electrically interconnected. The student operates the key switch 25 to identify the question being answered.

The rotary selector switch 38 is then operated by the student to select an answer to the identified question by rotation of the switch arm 42 thereof to a desired position. Thus, if the teaching program indicates a question and four answers, one of which is correct, only one position of the rotary selector switch 38 represents a corresponding one of the answers. The release switch 36 is then closed by the student to energize the relay 28 circuit. When the excitation winding 27 of the relay 28 is energized, the armatures of said relay are moved to their positions opposite those shown in FIG. 1 to close the indicating and recording circuit of the indicating resistor 54, via the armature 27d, to energize the signal lamp circuit via the armature 27c and to close the RC timer circuit 32, 33 of said excitation winding via the armature 27a.

The indicating resistor 54 provides an indication and record of the student's selection, when its circuit is closed, due to the moving of the lead end 55 in correspondence with the moving of the switch arm 42 of the rotary selector switch 38 by the student. If the selection is correct, the "correct" indicating lamp 44 is energized to indicate such fact. The RC timer circuit 32, 33 maintains the excitation winding 27 of the relay 28 energized for the period of time determined by the capacitor 32 and the magnitude of resistance of the resistor 33 connected in said RC timer circuit. After the termination of the determined period of time, the excitation winding 27 is deenergized and its armatures are returned to their positions shown in FIG. 1.

When the excitation winding 27 is deenergized, the armature 27b closes the circuit of the "ready condition" lamp 47 which is then energized to indicate that the response circuit is ready for the next selection. If the answer selected by the student is incorrect, the lamp 44 is not energized, but the indicating resistor 54 is energized via the armature 27e and functions to indicate and record the selection of an incorrect answer.

The response circuit of the present invention may be housed in a housing 61, as shown in FIG. 2. The housing 61 is of lightweight material and has a front panel comprising a plurality of apertures formed therethrough. The key switch 25 keys 25' are accessible through an aperture 62. The switch 43 is accessible at the front panel of the housing, as is the release switch 36. The signal lamps 44 and 47 are visible at the front panel of the housing. The switch arm 42 of the rotary selector switch 38 is controllable at the front panel of the housing through an aperture 63. A window 64 formed through the panel of the housing 61 provides a view of question code indicator (not shown) identifying code of the question being answered. A window 65 formed through the panel of the housing 61 provides a view of a code indicator (not shown) which indicates the identifying code initially selected by the student. The window 65 is mechanically coupled to the supply switch 15, so that said window is open as long as said switch is ON.

While the invention has been described by means of a specific example and in a specific embodiment, we do not wish to be limited thereto, for obvious modifications will occur to those skilled in the art without departing from the spirit and scope of the invention.

What is claimed is:

1. A response indicating and recording circuit for a programmed teaching system including a question and a plurality of possible responses with at least one correct response, comprising rotary response selector switch means having a rotary switch arm and a plurality of contacts in operative proximity with said switch arm, said switch arm being rotatable for electrically contacting a selected one of said contacts;

indicating resistor means for indicating and recording a selected response, said indicating resistor means being mechanically coupled to the switch arm of said rotary selector switch for varying the position of the indication provided by said indicating resistor means in accordance with the position of said rotary selector switch arm;

time-controlled relay means having an excitation winding, a plurality of armatures controlled by said excitation winding and a time control circuit connected to said excitation winding for controlling the duration of energization of said excitation winding;

resistor energizing circuit means connected to said indicating resistor means for providing a current flow heating said resistor means, an armature of said resistor means being connected in said resistor energizing circuit for controlling the operation of said indicating resistor;

heat sensitive record carrier disposed in operative proximity with said indicating resistor to record the position thereof;

relay energizing circuit means connected to the excitation winding of said relay means;

key switch means associated with said question and connected in said relay energizing circuit means, said key switch means comprising a plurality of switching contacts;

signalling means; and signalling means energizing circuit being connected to said signalling means via said key switch means, said rotary selector switch means and an armature of said relay to actuate said signalling means when said rotary switch arm is in a position representing the correct response and said relay energizing circuit means is closed.

2. A response circuit as claimed in claim 1, further comprising a switch connected between adjacent ones of the contacts of said rotary selector switch means for selectively connecting and disconnecting a group of said contacts from the remainder of said contacts.

3. A response circuit as claimed in claim 1, further comprising a release switch connected in said relay energizing circuit means.

4. A response circuit as claimed in claim 1, further comprising a housing said response circuit, said housing including a front panel having a plurality of apertures formed therethrough, the switch arm of said rotary selector switch means and the key of said key switch means being accessible via corresponding ones of said aperatures.

5. A response circuit as claimed in claim 1 wherein said key switch means comprises a plurality of keys for selecting a corresponding plurality of questions to be responded.

References Cited

UNITED STATES PATENTS

| 2,947,087 | 8/1960 | Arnold et al. | 35—48 |
| 3,319,356 | 5/1967 | Berkeley | 35—9 |

FOREIGN PATENTS

| 1,149,673 | 12/1957 | France. | |

EUGENE R. CAPOZIO, Primary Examiner

WALTER W. NIELSEN, Assistant Examiner

U.S. Cl. X.R.

35—8